United States Patent
Kashiwazaki et al.

(10) Patent No.: US 10,784,481 B2
(45) Date of Patent: Sep. 22, 2020

(54) NONAQUEOUS ELECTROLYTE SECONDARY BATTERY SEPARATOR

(71) Applicant: Sumitomo Chemical Company, Limited, Tokyo (JP)

(72) Inventors: Eiko Kashiwazaki, Osaka (JP); Chikara Murakami, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/129,898

(22) Filed: Sep. 13, 2018

(65) Prior Publication Data

US 2019/0081301 A1    Mar. 14, 2019

(30) Foreign Application Priority Data

Sep. 14, 2017    (JP) .................................. 2017-177053

(51) Int. Cl.
*H01M 2/16*        (2006.01)
*H01M 10/05*     (2010.01)
*H01M 2/14*        (2006.01)

(52) U.S. Cl.
CPC ........... *H01M 2/16* (2013.01); *H01M 2/1653* (2013.01); *H01M 10/05* (2013.01); *H01M 2/145* (2013.01)

(58) Field of Classification Search
None
See application file for complete search history.

(56) References Cited

U.S. PATENT DOCUMENTS

| | | | |
|---|---|---|---|
| 6,235,432 B1 | 5/2001 | Kono et al. | |
| 6,359,019 B1 | 3/2002 | Stone et al. | |
| 2002/0137806 A1 | 9/2002 | Stone et al. | |
| 2003/0096165 A1* | 5/2003 | Nakahara ............... | H01M 4/13 429/213 |
| 2005/0049319 A1 | 3/2005 | Stone et al. | |
| 2005/0170247 A1 | 8/2005 | Nakahara et al. | |
| 2008/0226988 A1 | 9/2008 | Minami et al. | |
| 2009/0123849 A1* | 5/2009 | Yamaguchi ......... | H01M 10/052 429/331 |

(Continued)

FOREIGN PATENT DOCUMENTS

JP    11-130900 A    5/1999
JP    2001522914 A    11/2001

(Continued)

OTHER PUBLICATIONS

Office Action dated Feb. 22, 2019 in KR Application No. 10-2018-0108053.

(Continued)

*Primary Examiner* — Daniel S Gatewood
(74) *Attorney, Agent, or Firm* — Panitch Schwarze Belisario & Nadel LLP

(57) ABSTRACT

With a nonaqueous electrolyte secondary battery separator having a radical concentration of $5000 \times 10^{12}$ spins/mg to $90000 \times 10^{12}$ spins/mg, wherein the concentration is calculated from a peak at a g-value of not less than 2.010 in an electron spin resonance spectrum obtained through electron spin resonance analysis using a microwave having a frequency of 9.4 GHz, it is possible to provide a nonaqueous electrolyte secondary battery having a high battery resistance decreasing rate before and after battery formation.

5 Claims, 1 Drawing Sheet

(56) References Cited

U.S. PATENT DOCUMENTS

| | | |
|---|---|---|
| 2017/0025659 A1 | 1/2017 | Suzuki |
| 2017/0155113 A1 | 6/2017 | Hashiwaki et al. |
| 2017/0317329 A1 | 11/2017 | Nakadate et al. |

FOREIGN PATENT DOCUMENTS

| | | |
|---|---|---|
| JP | 2002151084 A | 5/2002 |
| JP | 2012204185 A | 10/2012 |
| JP | 2017057238 A | 3/2017 |
| KR | 19990082451 | 11/1999 |
| KR | 20040075199 A | 8/2004 |
| KR | 20080083589 A | 9/2008 |
| KR | 20160145020 A | 12/2016 |
| KR | 20170063330 A | 6/2017 |
| WO | 2016072420 A1 | 5/2016 |

OTHER PUBLICATIONS

Office Action dated Sep. 28, 2018 in KR Application No. 10-2018-0108053.

* cited by examiner

• Drawing showing peak position of the electron spin resonance spectrum
Measurement conditions
Device: Electron spin resonance spectrometer (Bruker E500)
Sweep magnetic field range: 80 mT to 580 mT (5000 Gauss)
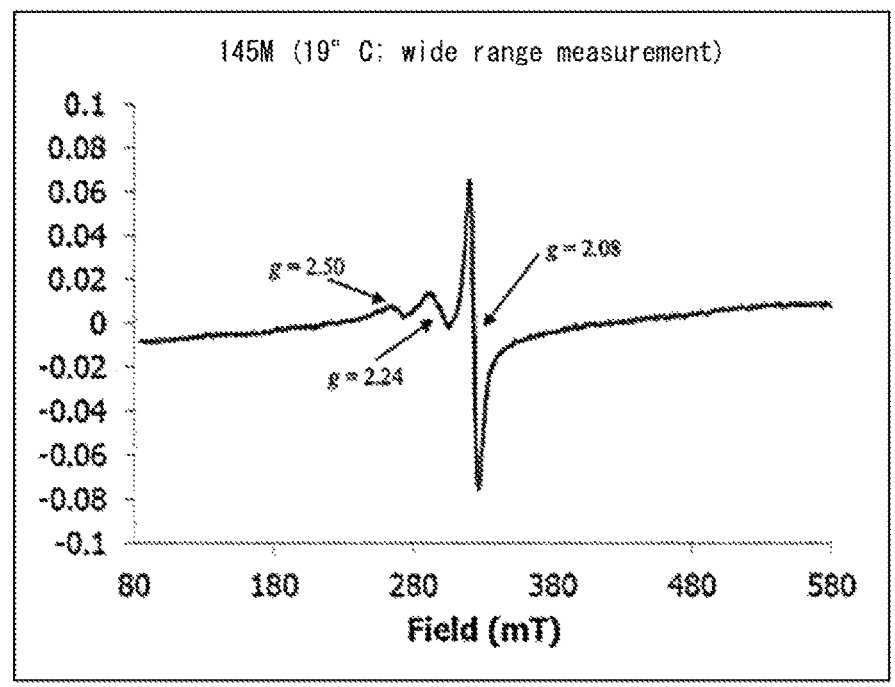

NONAQUEOUS ELECTROLYTE SECONDARY BATTERY SEPARATOR

This Nonprovisional application claims priority under 35 U.S.C. § 119 on Patent Application No. 2017-177053 filed in Japan on Sep. 14, 2017, the entire contents of which is hereby incorporated by reference.

TECHNICAL FIELD

The present invention relates to a separator for a nonaqueous electrolyte secondary battery (hereinafter referred to as a "nonaqueous electrolyte secondary battery separator").

BACKGROUND ART

Nonaqueous electrolyte secondary batteries such as a lithium secondary battery are currently in wide use as (i) batteries for devices such as a personal computer, a mobile telephone, and a portable information terminal or (ii) on-vehicle batteries.

As a separator for use in such a nonaqueous electrolyte secondary battery, a porous film containing polyolefin as a main component, as disclosed in, for example, Patent Literature 1 is known.

CITATION LIST

Patent Literature

[Patent Literature 1]
Japanese Patent Application Publication, Tokukaihei, No. 11-130900 (1999)

SUMMARY OF INVENTION

Technical Problem

It is an object of the present invention to provide a nonaqueous electrolyte secondary battery separator that makes it possible to provide a nonaqueous electrolyte secondary battery excellent in "battery resistance decreasing rate before and after battery formation", which is a rate of decrease (rate of change) of battery resistance before and after initial charge and discharge.

Solution to Problem

The present invention includes the following [1] through [3]:

[1] A nonaqueous electrolyte secondary battery separator including: a polyolefin porous film, the nonaqueous electrolyte secondary battery separator having a concentration of radicals of not less than $5000 \times 10^{12}$ spins/mg and not more than $90000 \times 10^{12}$ spins/mg, wherein the concentration is calculated from a peak at a g-value of not less than 2.010 in an electron spin resonance spectrum obtained through electron spin resonance analysis using a microwave having a frequency of 9.4 GHz.

[2] A nonaqueous electrolyte secondary battery member including: a positive electrode; a nonaqueous electrolyte secondary battery separator as described in [1]; and a negative electrode, the positive electrode, the nonaqueous electrolyte secondary battery separator, and the negative electrode being disposed in this order.

[3] A nonaqueous electrolyte secondary battery including: a nonaqueous electrolyte secondary battery separator as described in [1].

Advantageous Effects of Invention

A nonaqueous electrolyte secondary battery separator in accordance with an embodiment of the present invention produces the effect of allowing a nonaqueous electrolyte secondary battery including the nonaqueous electrolyte secondary battery separator to be excellent in battery resistance decreasing rate before and after battery formation.

BRIEF DESCRIPTION OF DRAWINGS

FIG. 1 is a diagram showing peak positions in the electron spin resonance spectrum in accordance with an embodiment of the present invention.

DESCRIPTION OF EMBODIMENTS

The following description will discuss an embodiment of the present invention. Note, however, that the present invention is not limited to the embodiment below. The present invention is not limited to the arrangements described below, but may be altered in various ways by a skilled person within the scope of the claims. Any embodiment based on a proper combination of technical means disclosed in different embodiments is also encompassed in the technical scope of the present invention. Note that numerical expressions such as "A to B" herein mean "not less than A and not more than B" unless otherwise stated.

Embodiment 1: Nonaqueous Electrolyte Secondary Battery Separator

A nonaqueous electrolyte secondary battery separator in accordance with Embodiment 1 of the present invention is a nonaqueous electrolyte secondary battery separator including: a polyolefin porous film, the nonaqueous electrolyte secondary battery separator having a concentration of radicals of not less than $5000 \times 10^{12}$ spins/mg and not more than $90000 \times 10^{12}$ spins/mg, wherein the concentration is calculated from a peak at a g-value of not less than 2.010 in an electron spin resonance spectrum obtained through electron spin resonance analysis using a microwave having a frequency of 9.4 GHz.

The "electron spin resonance analysis" is a spectroscopy in which an absorption spectrum of a sample is measured under irradiation by an electromagnetic wave (microwave) having a given wavelength under the conditions where a magnetic field is swept in a given range to detect unpaired electrons in the sample. The absorption spectrum can also be referred to as electron spin resonance (ESR) spectrum.

In the magnetic field, energy levels of orbits on which unpaired electrons exist in the sample are split by directions of spins of the unpaired electrons. In a case where an energy level difference between the split orbits is equal to an energy of a microwave by which the sample is irradiated, the sample absorbs that microwave. Consequently, a transition of electrons between the split orbits occurs.

Here, in a magnetic field having a particular strength, an energy level difference between the split orbits depends on an electrical state of a surrounding of the unpaired electrons, i.e., the types, structures, and forms of substances in the sample. In other words, the strength of a magnetic field in which the energy level difference between the split orbits is a certain difference also depends on the types, structures, and forms of substances in the sample.

The ESR spectrum as used herein is an ESR spectrum which is measured through electron spin resonance analysis using a microwave having a frequency of 9.4 GHz.

The peak position of the ESR spectrum is expressed as a g-value that depends on the reciprocal of the strength of magnetic field applied to a sample.

Specifically, the g-value is expressed by the following equation (1):

$$g=h\nu/\beta H \tag{1}$$

wherein h represents Planck constant ($6.624 \times 10^{-34}$ [J·s]), ν represents a frequency [Hz] of a microwave, β represents Bohr magneton ($927.4 \times 10^{-26}$ [J·T$^{-1}$]), and H represents a strength [T] of magnetic field corresponding to a peak position.

For the ESR spectra targeting organic compounds, it is known that, in most cases, a peak having a narrow width is observed at a g-value in a range of not less than 2.000 and less than 2.010. Meanwhile, for the ESR spectra targeting inorganic compounds, it is known that a peak having a wide width is observed at a g-value which is greater than the values in the above range (i.e., at a g-value of 2.010 or more).

That is, in the nonaqueous electrolyte secondary battery separator in accordance with an embodiment of the present invention, the "concentration of radicals which concentration is calculated from a peak at a g-value of not less than 2.010 in an electron spin resonance spectrum obtained through electron spin resonance analysis using a microwave having a frequency of 9.4 GHz" (hereinafter also referred to as radical concentration) means the amount (concentration) of inorganic substance-derived radicals contained in the nonaqueous electrolyte secondary battery separator in accordance with Embodiment 1 of the present invention. Such inorganic substance-derived radicals are also referred to as "inorganic radicals".

Further, the radical concentration in an embodiment of the present invention is calculated by using a calibration curve generated from the ESR spectrum of a standard sample having a known concentration on the assumption that all of the inorganic radicals are inorganic radicals with spin S=½.

Specifically, based on the calibration curve generated from an area of an absorption peak in the ESR spectrum of the standard sample having a known concentration, the concentration of inorganic radicals contained in the sample, namely, the radical concentration is calculated from an area of an absorption peak in the ESR spectrum of a sample to be measured.

Note that in a case where two or more peaks at the g-value of not less than 2.010 are present in the ESR spectrum of the sample to be measured, separate inorganic radical concentrations are calculated from the respective two or more peaks. Thereafter, the inorganic radical concentrations thus calculated from the respective two or more peaks are summed to determine the radical concentration in an embodiment of the present invention.

Further, the sample to be measured may be a nonaqueous electrolyte secondary battery separator containing a polyolefin porous film (described later) or may be a nonaqueous electrolyte secondary battery separator which is a laminated body containing the polyolefin porous film and an insulating porous layer (described later).

That is, the nonaqueous electrolyte secondary battery separator in accordance with Embodiment 1 of the present invention is the one that contains inorganic radicals.

The inorganic radicals contained in the nonaqueous electrolyte secondary battery separator in accordance with Embodiment 1 of the present invention are considered to be derived from a polymerization catalyst which is contained in a material used during production of the separator, such as a raw resin (polyolefin resin) and an additive (e.g., petroleum resin). More specifically, the inorganic radicals contained in the nonaqueous electrolyte secondary battery separator in accordance with Embodiment 1 of the present invention are considered to be derived from a polymerization catalyst which has been used during production of the raw resin or the additive and has remained in the raw resin or the additive.

The inorganic radicals are not limited to any particular ones, but may be derived from a transition metal. For example, the inorganic radicals may be derived from a first row transition metal. Specifically, the inorganic radicals may be derived from, for example, any of base metals including transition metals such as iron, nickel, chromium, aluminum, and titanium A nonaqueous electrolyte secondary battery is typically subjected to an initial charge and discharge at a low voltage after assembly. During the initial charge and discharge, a solid electrolyte interphase (SEI) film is formed on the surface of a negative electrode (described later). It is known that this film is formed from an organic substance and an inorganic substance and contains a cation (e.g., Li$^+$)-based inorganic substance and a reduction product of an electrolyte solvent (e.g., ethylene carbonate (EC)).

In the process of the initial charge and discharge, it is known that a solvent molecule (EC) in an electrolyte in contact with a negative electrode active material on the surface of the negative electrode gains an electron (e$^-$) to turn into a reduced product, and the reduced product reacts with another reduced product to form an organic substance which serves as a constituent element of the SEI film. Note that in a case where the electrolyte contains a substance, such as an additive, which can react with the reduced product, the reduced product reacts with the additive or the like to form an organic substance which serves as a constituent element of the SEI film.

In the nonaqueous electrolyte secondary battery, during charge, cations (e.g., Li$^+$), which are charge carriers, are released from the positive electrode and are flown into the negative electrode. Thus, during charge, the cations are present with concentration in an interface between the nonaqueous electrolyte secondary battery separator and the negative electrode, and accordingly, electrons are present with concentration in that interface.

Consequently, during charge, due to the presence of electrons with concentration in the interface, a large amount of solvent molecules are converted into the reduced products in the interface. This facilitates formation of a SEI film on the surface of the negative electrode in the interface. Thus, it is considered that a thick SEI film is formed.

The surface of the negative electrode in the interface serves as an entrance through which the cations enter the negative electrode during charge and serves as an exit through which the cations exit to the outside of the negative electrode during discharge.

Thus, the formation of a thick SEI film on the surface of the negative electrode prevents the cations from moving from the negative electrode to the positive electrode and vice versa. This is considered to consequently cause the nonaqueous electrolyte secondary battery to have a high battery resistance.

Meanwhile, in a case where no SEI film or too thin a SEI film is formed on the surface of the negative electrode, the flow of electrons through the surface of the negative electrode into the electrolyte cannot be sufficiently prevented. This causes the electrolyte to be decomposed on the surface of the negative electrode to an excessive degree, so that the electrolyte is depleted. This may actually decrease battery performance.

The inorganic radicals contained in the nonaqueous electrolyte secondary battery separator in accordance with Embodiment 1 of the present invention are considered to contribute, in the above-described SEI film formation reaction, to stabilization of reduction intermediates (e.g., one-electron reduction radicals of ethylene carbonate and carbon monoxide) of the solvent molecules in the electrolyte. Thus, it is considered that adjusting the amount of the inorganic radicals to a specific range suitably controls the SEI film formation reaction, so that a SEI film having a film thickness suitable for the interface can be formed. This, consequently, can be considered to reduce an increase in battery resistance after the initial charge and discharge, as compared with the conventional technique, so that a battery resistance decreasing rate before and after battery formation of the nonaqueous electrolyte secondary battery (hereinafter also referred to as "battery resistance decreasing rate" as necessary) can be improved. Further, in a case where the inorganic radicals are present in an excessive amount, they excessively stabilize reduction intermediates of the solvent molecules in the electrolyte. This may prevent the SEI formation.

Note that since the inorganic radicals catalytically act on the formation of a SEI film as described above, the amount of the inorganic radicals contained in the nonaqueous electrolyte secondary battery separator in accordance with Embodiment 1 of the present invention do not substantially vary between before and after the formation of the SEI film through charge and discharge.

Therefore, it is considered that the amount of the inorganic radicals after charge and discharge of the assembled nonaqueous electrolyte secondary battery do not substantially vary from the amount of the inorganic radicals before assembly of the nonaqueous electrolyte secondary battery.

From the viewpoint of improving the battery resistance decreasing rate, the nonaqueous electrolyte secondary battery separator in accordance with Embodiment 1 of the present invention has the radical concentration of not less than $5000 \times 10^{12}$ spins/mg, preferably not less than $5400 \times 10^{12}$ spins/mg, and more preferably not less than $10000 \times 10^{12}$ spins/mg. From the same viewpoint, the nonaqueous electrolyte secondary battery separator in accordance with Embodiment 1 of the present invention has the radical concentration of not more than $90000 \times 10^{12}$ spins/mg, preferably not more than $86000 \times 10^{12}$ spins/mg, and more preferably not more than $70000 \times 10^{12}$ spins/mg.

The nonaqueous electrolyte secondary battery separator in accordance with Embodiment 1 of the present invention typically includes a polyolefin porous film, and is preferably constituted by a polyolefin porous film. Further, the nonaqueous electrolyte secondary battery separator in accordance with Embodiment 1 of the present invention can be a nonaqueous electrolyte secondary battery separator which is a laminated body including the polyolefin porous film and an insulating porous layer (described later) (hereinafter also referred to as nonaqueous electrolyte secondary battery laminated separator). Still further, the nonaqueous electrolyte secondary battery separator in accordance with Embodiment 1 of the present invention can contain, in addition to the insulating porous layer, other porous layer as needed.

The other porous layer includes publicly known porous layers such as a heat-resistant layer, an adhesive layer, and a protective layer (described later).

Note, here, that the "polyolefin porous film" is a porous film which contains a polyolefin-based resin as a main component. Note that the phrase "contains a polyolefin-based resin as a main component" means that a porous film contains a polyolefin-based resin at a proportion of not less than 50% by volume, preferably not less than 90% by volume, and more preferably not less than 95% by volume, relative to the whole of materials of which the porous film is made. The polyolefin porous film can be a base material of a nonaqueous electrolyte secondary battery separator in accordance with an embodiment of the present invention.

The polyolefin porous film has therein many pores, connected to one another, so that a gas and/or a liquid can pass through the polyolefin porous film from one side to the other side.

The polyolefin-based resin more preferably contains a high molecular weight component having a weight-average molecular weight of $3 \times 10^5$ to $15 \times 10^6$. In particular, the polyolefin-based resin more preferably contains a high molecular weight component having a weight-average molecular weight of not less than 1,000,000 because the polyolefin porous film and a nonaqueous electrolyte secondary battery laminated separator including such a polyolefin porous film each have a higher strength.

Examples of the polyolefin-based resin which the polyolefin porous film contains as a main component include, but are not particularly limited to, homopolymers (for example, polyethylene, polypropylene, and polybutene) and copolymers (for example, ethylene-propylene copolymer) both of which are thermoplastic resins and are each produced through polymerization of a monomer(s) such as ethylene, propylene, 1-butene, 4-methyl-1-pentene, and/or 1-hexene. The polyolefin porous film can include a layer containing only one of these polyolefin-based resins or a layer containing two or more of these polyolefin-based resins.

Among these, polyethylene is preferable as it is capable of preventing (shutting down) a flow of an excessively large electric current at a lower temperature. Particularly, a high molecular weight polyethylene containing ethylene as a main component is more preferable. Note that the polyolefin porous film can contain a component(s) other than polyolefin as long as such a component does not impair the function of the layer.

Examples of the polyethylene include low-density polyethylene, high-density polyethylene, linear polyethylene (ethylene-α-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is preferable. It is more preferable that the polyethylene contain a high molecular weight component having a weight-average molecular weight of $5 \times 10^5$ to $15 \times 10^6$.

The film thickness of the polyolefin porous film is not particularly limited, but is preferably 4 μm to 40 μm, and more preferably 5 μm to 20 μm.

The film thickness of the polyolefin porous film is preferably not less than 4 μm since an internal short circuit of a battery can be sufficiently prevented with such a film thickness.

On the other hand, the film thickness of the polyolefin porous film is preferably not more than 40 μm since an increase in size of a nonaqueous electrolyte secondary battery can be prevented with such a thickness.

The polyolefin porous film typically has a weight per unit area of preferably 4 g/m² to 20 g/m², and more preferably 5 g/m² to 12 g/m², so as to allow a nonaqueous electrolyte secondary battery to have a higher weight energy density and a higher volume energy density.

The polyolefin porous film has an air permeability of preferably 30 sec/100 mL to 500 sec/100 mL, and more preferably 50 sec/100 mL to 300 sec/100 mL, in terms of Gurley values, since a sufficient ion permeability is exhibited with such an air permeability.

The polyolefin porous film has a porosity of preferably 20% by volume to 80% by volume, and more preferably 30% by volume to 75% by volume, so as to (i) retain a larger amount of electrolyte and (ii) obtain the function of reliably preventing (shutting down) a flow of an excessively large electric current at a lower temperature.

The polyolefin porous film has a pore diameter of preferably not more than 0.3 μm and more preferably not more than 0.14 μm, in view of sufficient ion permeability and of preventing particles, constituting an electrode, from entering the pores of the polyolefin porous film.

[Method of Producing Polyolefin Porous Film]

Examples of a method of producing the polyolefin porous film include, but are not particularly limited to, a method in which a polyolefin-based resin and additives are kneaded and then extruded to obtain a sheet-shaped polyolefin resin composition, the polyolefin resin composition thus obtained is stretched, and then the polyolefin resin composition is subjected to cleaning with a suitable solvent, drying, and heat fixing.

Specifically, the method can be a method including the following steps of:

(A) melt-kneading a polyolefin-based resin and an additive (i), which is in solid form at normal temperature (at approximately 25° C.), in a kneader to obtain a molten mixture;

(B) putting an additive (ii), which is in liquid form at normal temperature, into the kneader to mix the additive (ii) with the molten mixture having been obtained in the step (A) and then kneading a mixture to obtain a polyolefin resin composition;

(C) extruding, through a T-die of an extruder, the polyolefin resin composition having been obtained in the step (B), and then shaping the polyolefin resin composition into a sheet while cooling the polyolefin resin composition, so that a sheet-shaped polyolefin resin composition is obtained;

(D) stretching the sheet-shaped polyolefin resin composition having been obtained in the step (C);

(E) cleaning, with use of a cleaning liquid, the polyolefin resin composition having been stretched in the step (D); and (F) drying and heat fixing the polyolefin resin composition having been cleaned in the step (E), so that a polyolefin porous film is obtained.

In the step (A), the polyolefin-based resin is used in an amount of preferably 6% by weight to 45% by weight, and more preferably 9% by weight to 36% by weight, with respect to 100% by weight of the polyolefin resin composition to be obtained.

Examples of the additive (i) used in the step (A) include petroleum resin. The petroleum resin is preferably an aliphatic hydrocarbon resin having a softening point of 90° C. to 125° C. or an alicyclic saturated hydrocarbon resin having a softening point of 90° C. to 125° C., and is more preferably the alicyclic saturated hydrocarbon resin having a softening point of 90° C. to 125° C. The additive (i) is used in an amount of preferably 0.5% by weight to 40% by weight, and more preferably 1% by weight to 30% by weight, with respect to 100% by weight of the polyolefin resin composition to be obtained.

Examples of the additive (ii) used in the step (B) include: phthalate esters such as dioctyl phthalate; unsaturated higher alcohol such as oleyl alcohol; saturated higher alcohol such as stearyl alcohol; low molecular weight polyolefin-based resin such as paraffin wax; and liquid paraffin. The additive (ii) is preferably a plasticizing agent, such as liquid paraffin, which serves as a pore forming agent.

The additive (ii) is used in an amount of preferably 50% by weight to 90% by weight, and more preferably 60% by weight to 85% by weight, with respect to 100% by weight of the polyolefin resin composition to be obtained.

In the step (B), an internal temperature of the kneader after the additive (ii) has been put into the kneader is preferably not lower than 140° C. to not higher than 200° C., and more preferably not lower than 180° C. to not higher than 197° C.

In the step (C), a T-die extrusion temperature at the time of extruding the polyolefin resin composition is preferably 200° C. to 220° C., and more preferably 205° C. to 215° C.

In the step (D), it is possible to use a commercially-available stretching apparatus for stretching the sheet-shaped polyolefin resin composition. Specifically, the sheet-shaped polyolefin resin composition may be stretched by (i) a method in which an end of the sheet is seized by a chuck and the sheet is drawn, (ii) a method in which rollers for conveying the sheet are set at different rotation speeds so as to draw the sheet, or (iii) a method in which the sheet is rolled by using a pair of rollers.

Stretching is preferably performed both in the MD direction and in the TD direction. Examples of a method of stretching the sheet both in the MD direction and in the TD direction include: sequential biaxial stretching in which the sheet is first stretched in the MD direction and then stretched in the TD direction; and simultaneous biaxial stretching in which the sheet is simultaneously stretched in the MD direction and the TD direction.

In the step (D), the stretch magnification at which the sheet-shaped polyolefin resin composition is stretched in the MD direction is preferably 4.0 times to 7.5 times, and more preferably 4.0 times to 6.5 times. The stretch magnification at which the sheet-shaped polyolefin resin composition is stretched in the TD direction is preferably 4.0 times to 7.5 times, and more preferably 4.0 times to 6.5 times. The sheet-shaped polyolefin resin composition is stretched at a temperature of preferably not higher than 130° C., and more preferably 100° C. to 130° C.

The cleaning liquid used in the step (E) can be any solvent that can remove an additive such as a pore forming agent. Examples of the cleaning liquid include heptane and dichloromethane.

By adjusting a cleaning time in the step (E), it is possible to control the amount of the inorganic radicals, derived from a polymerization catalyst, remaining in a nonaqueous electrolyte secondary battery separator to be obtained. The conventional nonaqueous electrolyte secondary battery separator is obtained through the cleaning step for a relatively long cleaning time and thus has the above-described inorganic radicals in an amount smaller than that of the radicals contained in the nonaqueous electrolyte secondary battery separator in accordance with Embodiment 1 of the present invention.

In contrast, in an embodiment of the present invention, by shortening the cleaning time as compared to the conventional technique, it is possible to suitably produce the nonaqueous electrolyte secondary battery separator in accordance with Embodiment 1 of the present invention, wherein the amount of the inorganic radicals is larger than that of the inorganic radicals in the conventional nonaqueous electrolyte secondary battery separator, and the radical concentration is adjusted to a range of not less than $5000 \times 10^{12}$ spins/mg and not more than $90000 \times 10^{12}$ spins/mg.

Specifically, examples of the conventional cleaning method in the step (E) encompass a method in which a stretched polyolefin resin composition is cleaned with one cleaning liquid for 25 seconds or longer and is then cleaned with another cleaning liquid for 25 seconds or longer.

In contrast, a cleaning method in the step (E) for producing the nonaqueous electrolyte secondary battery separator in accordance with Embodiment 1 of the present invention is preferably a method in which a stretched polyolefin resin composition is cleaned with one cleaning liquid for 15 seconds and is then cleaned with another cleaning liquid for 15 seconds, more preferably a method in which a stretched polyolefin resin composition is cleaned with one cleaning liquid for 10 seconds and is then cleaned with another cleaning liquid for 10 seconds, and even more preferably a method in which a stretched polyolefin resin composition is cleaned with one cleaning liquid for 5 seconds and is then cleaned with another cleaning liquid for 5 seconds.

The polyolefin resin composition from which the additive has been removed in the step (F) is dried to remove the solvent for cleaning from the polyolefin resin composition. The drying operation is preferably performed, simultaneously with the following heat fixing operation, by heat treatment at a specific temperature.

The heat treatment is performed at a temperature of preferably not lower than 80° C. to not higher than 140° C., and more preferably not lower than 100° C. to not higher than 135° C. The heat treatment is performed for a time of preferably not shorter than 0.5 minutes to not longer than 30 minutes, more preferably not shorter than 1 minute to not longer than 15 minutes.

The step (F) can be performed with use of devices which can be generally used for an operation in the step (F), such as a temperature control roller(s) and a ventilation temperature-controlled chamber.

[Insulating Porous Layer]

In a case where the nonaqueous electrolyte secondary battery separator in accordance with Embodiment 1 of the present invention is a nonaqueous electrolyte secondary battery laminated separator, the nonaqueous electrolyte secondary battery laminated separator preferably includes the polyolefin porous film and an insulating porous layer disposed on the polyolefin porous film.

The insulating porous layer (hereinafter, also referred to simply as "porous layer") is normally a resin layer containing a resin and is preferably a heat-resistant layer or an adhesion layer. The insulating porous layer preferably contains a resin that is insoluble in an electrolyte of a battery and that is electrochemically stable when the battery is in normal use.

The porous layer is provided on one surface or both surfaces of the polyolefin porous film as needed. In a case where the porous layer is provided on one surface of the polyolefin porous film, the porous layer is preferably provided on that surface of the polyolefin porous film which surface faces a positive electrode of a nonaqueous electrolyte secondary battery to be produced, more preferably on that surface of the polyolefin porous film which surface comes into contact with the positive electrode.

Examples of the resin of which the porous layer is made encompass: polyolefins; (meth)acrylate-based resins; fluorine-containing resins; polyamide-based resins; polyimide-based resins; polyester-based resins; rubbers; resins with a melting point or glass transition temperature of not lower than 180° C.; and water-soluble polymers.

Among the above resins, polyolefins, acrylate-based resins, fluorine-containing resins, polyamide-based resins, polyester-based resins and water-soluble polymers are preferable. As the polyamide-based resins, wholly aromatic polyamides (aramid resins) are preferable. As the polyester-based resins, polyarylates and liquid crystal polyesters are preferable.

The porous layer may contain fine particles. The term "fine particles" herein means organic fine particles or inorganic fine particles generally referred to as a filler. Therefore, in a case where the porous layer contains fine particles, the above resin contained in the porous layer has a function as a binder resin for binding (i) fine particles together and (ii) fine particles and the porous film. The fine particles are preferably electrically insulating fine particles.

Examples of the organic fine particles contained in the porous layer encompass resin fine particles.

Specific examples of the inorganic fine particles contained in the porous layer encompass fillers made of inorganic matters such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, and glass. These inorganic fine particles are electrically insulating fine particles. The porous layer may contain only one kind of the fine particles or two or more kinds of the fine particles in combination.

Among the above fine particles, fine particles made of an inorganic matter is suitable. Fine particles made of an inorganic oxide such as silica, calcium oxide, magnesium oxide, titanium oxide, alumina, mica, zeolite, aluminum hydroxide, or boehmite are preferable. Further, fine particles made of at least one kind selected from the group consisting of silica, magnesium oxide, titanium oxide, aluminum hydroxide, boehmite, and alumina are more preferable. Fine particles made of alumina are particularly preferable.

A fine particle content of the porous layer is preferably 1% by volume to 99% by volume, and more preferably 5% by volume to 95% by volume with respect to 100% by volume of the porous layer. In a case where the fine particle content falls within the above range, it is less likely for a void, which is formed when fine particles come into contact with each other, to be blocked by a resin or the like. This makes it possible to achieve sufficient ion permeability and a proper weight per unit area of the porous layer.

The porous layer may include a combination of two or more kinds of fine particles which differ from each other in particle and/or specific surface area.

A thickness of the porous layer is preferably 0.5 µm to 15 µm per single porous layer, and more preferably 2 µm to 10 µm per single porous layer.

If the thickness of the porous layer is less than 0.5 µm per single porous layer, it may not be possible to sufficiently prevent an internal short circuit caused by breakage or the like of a battery. In addition, an amount of electrolyte to be retained by the porous layer may decrease. On the other hand, if the thickness of the porous layer is above 15 µm per single porous layer, then battery characteristics may deteriorate.

The weight per unit area of the porous layer is preferably 1 g/m² to 20 g/m² per single porous layer, and more preferably 4 g/m² to 10 g/m² per single porous layer.

A volume per square meter of a porous layer constituent component contained in the porous layer is preferably 0.5 cm³ to 20 cm³ per single porous layer, more preferably 1 cm³ to 10 cm³ per single porous layer, and still more preferably 2 cm³ to 7 cm³ per single porous layer.

For the purpose of obtaining sufficient ion permeability, a porosity of the porous layer is preferably 20% by volume to 90% by volume, and more preferably 30% by volume to 80% by volume. In order for a nonaqueous electrolyte secondary battery laminated separator to obtain sufficient ion permeability, a pore diameter of each of pores of the porous layer is preferably not more than 3 µm, and more preferably not more than 1 µm.

[Nonaqueous Electrolyte Secondary Battery Laminated Separator]

The nonaqueous electrolyte secondary battery separator in accordance with Embodiment 1 of the present invention can be a laminated body which is a nonaqueous electrolyte secondary battery laminated separator.

The laminated body has a film thickness of preferably 5.5 µm to 45 µm, and more preferably 6 µm to 25 µm.

The laminated body has an air permeability of preferably 30 sec/100 mL to 1000 sec/100 mL, and more preferably 50 sec/100 mL to 800 sec/100 mL, in terms of Gurley values.

[Method of Producing Nonaqueous Electrolyte Secondary Battery Laminated Separator (Laminated Body)]

The nonaqueous electrolyte secondary battery laminated separator (laminated body) in accordance with an embodiment of the present invention can be produced by, for example, applying a coating solution (described later) to a surface of the polyolefin porous film in accordance with an embodiment of the present invention and then drying the coating solution so as to deposit the insulating porous layer.

Prior to applying the coating solution to a surface of the polyolefin porous film in accordance with an embodiment of the present invention, the surface to which the coating solution is to be applied can be subjected to a hydrophilization treatment as needed.

The coating solution for use in a method for producing a nonaqueous electrolyte secondary battery laminated separator (laminated body) in accordance with an embodiment of the present invention can be prepared typically by (i) dissolving, in a solvent, a resin that may be contained in the porous layer described above and (ii) dispersing, in the solvent, fine particles that may be contained in the porous layer described above. Note, here, that the solvent in which the resin is to be dissolved also serves as a dispersion medium in which the fine particles are to be dispersed. Note, here, that the resin may be contained as an emulsion in the coating solution, instead of being dissolved in the solvent.

The solvent (dispersion medium) is not limited to any particular one, provided that (i) the solvent does not have an adverse effect on the polyolefin porous film, (ii) the solvent allows the resin to be uniformly and stably dissolved in the solvent, and (iii) the solvent allows the fine particles to be uniformly and stably dispersed in the solvent. Specific examples of the solvent (dispersion medium) encompass water and organic solvents. Only one of these solvents can be used, or two or more of these solvents can be used in combination.

The coating solution may be prepared by any method that allows the coating solution to satisfy conditions such as the resin solid content (resin concentration) and the fine-particle amount that are necessary to produce a desired porous layer. Specific examples of the method of forming the coating solution encompass a mechanical stirring method, an ultrasonic dispersion method, a high-pressure dispersion method, and a media dispersion method.

Further, the coating solution may contain, as a component (s) other than the resin and the fine particles, an additive(s) such as a disperser, a plasticizer, a surfactant, and/or a pH adjustor, provided that the additive does not prevent the object of an embodiment of the present invention from being attained. Note that the additive may be contained in an amount that does not prevent the object of an embodiment of the present invention from being attained.

A method of applying the coating solution to the polyolefin porous film, that is, a method of forming a porous layer on a surface of the polyolefin porous film is not limited to any particular one. The porous layer can be formed by, for example, (i) a method including the steps of applying the coating solution directly to a surface of the polyolefin porous film and then removing the solvent (dispersion medium), (ii) a method including the steps of applying the coating solution to an appropriate support, removing the solvent (dispersion medium) for formation of a porous layer, then pressure-bonding the porous layer to the polyolefin porous film, and subsequently peeling the support off, and (iii) a method including the steps of applying the coating solution to a surface of an appropriate support, then pressure-bonding the polyolefin porous film to that surface, then peeling the support off, and subsequently removing the solvent (dispersion medium).

The coating solution can be applied by a conventionally publicly known method. Specific examples of such a method include a gravure coater method, a dip coater method, a bar coater method, and a die coater method.

The solvent (dispersion medium) is typically removed by a drying method. The solvent (dispersion medium) contained in the coating solution may be replaced with another solvent before a drying operation.

Embodiment 2: Nonaqueous Electrolyte Secondary Battery Member; Embodiment 3: Nonaqueous Electrolyte Secondary Battery A nonaqueous electrolyte secondary battery member in accordance with Embodiment 2 of the present invention is obtained by including a positive electrode, a nonaqueous electrolyte secondary battery separator in accordance with Embodiment 1 of the present invention, and a negative electrode, the positive electrode, the nonaqueous electrolyte secondary battery separator, and the negative electrode being disposed in this order.

A nonaqueous electrolyte secondary battery in accordance with Embodiment 3 of the present invention includes the nonaqueous electrolyte secondary battery separator in accordance with Embodiment 1 of the present invention.

A nonaqueous electrolyte secondary battery in accordance with Embodiment 3 of the present invention can be, for example, a nonaqueous secondary battery that achieves an electromotive force through doping with and dedoping of lithium, and can include a nonaqueous electrolyte secondary battery member including a positive electrode, a nonaqueous electrolyte secondary battery separator in accordance with Embodiment 1 of the present invention, and a negative electrode, the positive electrode, the nonaqueous electrolyte secondary battery separator, and the negative electrode being disposed in this order. Note that constituent elements, other than the nonaqueous electrolyte secondary battery separator, of the nonaqueous electrolyte secondary battery are not limited to those described below.

The nonaqueous electrolyte secondary battery in accordance with Embodiment 3 of the present invention is typically arranged so that a battery element is enclosed in an exterior member, the battery element including (i) a structure in which the negative electrode and the positive electrode face each other via the nonaqueous electrolyte secondary battery separator in accordance with Embodiment 1 of the present invention and (ii) an electrolyte with which the structure is impregnated. The nonaqueous electrolyte secondary battery is preferably a secondary battery including a nonaqueous electrolyte, and is particularly preferably a lithium-ion secondary battery. Note that the doping means occlusion, support, adsorption, or insertion, and means a phenomenon in which lithium ions enter an active material of an electrode (e.g., a positive electrode).

A nonaqueous electrolyte secondary battery member in accordance with Embodiment 2 of the present invention includes the nonaqueous electrolyte secondary battery separator in accordance with Embodiment 1 of the present invention. Thus, the nonaqueous electrolyte secondary battery member in accordance with Embodiment 2 of the present invention allows a nonaqueous electrolyte secondary battery into which the nonaqueous electrolyte secondary battery member is incorporated to have an improved battery resistance decreasing rate before and after battery formation. The nonaqueous electrolyte secondary battery in accordance with Embodiment 3 of the present invention includes the nonaqueous electrolyte secondary battery separator in accordance with Embodiment 1 of the present invention. Thus, the nonaqueous electrolyte secondary battery in accordance with Embodiment 3 of the present invention is advantageously excellent in battery resistance decreasing rate before and after battery formation.

<Positive Electrode>

A positive electrode included in the nonaqueous electrolyte secondary battery member in accordance with Embodiment 2 of the present invention or in the nonaqueous electrolyte secondary battery in accordance with Embodiment 3 of the present invention is not limited to any particular one, provided that the positive electrode is one that is generally used as a positive electrode of a nonaqueous electrolyte secondary battery. Examples of the positive electrode encompass a positive electrode sheet having a structure in which an active material layer containing a positive electrode active material and a binder resin is formed on a current collector. The active material layer may further contain an electrically conductive agent.

The positive electrode active material is, for example, a material capable of being doped with and dedoped of lithium ions. Specific examples of such a material encompass a lithium complex oxide containing at least one transition metal such as V, Mn, Fe, Co, or Ni.

Examples of the electrically conductive agent include carbonaceous materials such as natural graphite, artificial graphite, cokes, carbon black, pyrolytic carbons, carbon fiber, and a fired product of an organic polymer compound. It is possible to use only one kind of the above electrically conductive agents or two or more kinds of the above electrically conductive agents in combination.

Examples of the binding agent encompass (i) fluorine-based resins such as polyvinylidene fluoride, (ii) acrylic resin, and (iii) styrene butadiene rubber. Note that the binding agent serves also as a thickener. It is possible to use only one kind of the above binding agents or two or more kinds of the above binding agents in combination.

Examples of the cathode current collector encompass electric conductors such as Al, Ni, and stainless steel. Among these, Al is preferable because Al is easily processed into a thin film and is inexpensive.

Examples of a method for producing the positive electrode sheet encompass: a method in which a positive electrode active material, an electrically conductive agent, and a binding agent are pressure-molded on a positive electrode current collector; and a method in which (i) a positive electrode active agent, an electrically conductive agent, and a binding agent are formed into a paste with the use of a suitable organic solvent, (ii) then, a positive electrode current collector is coated with the paste, and (iii) subsequently, the paste is dried and then pressured so that the paste is firmly fixed to the positive electrode current collector.

<Negative Electrode>

A negative electrode included in the nonaqueous electrolyte secondary battery member in accordance with Embodiment 2 of the present invention or in the nonaqueous electrolyte secondary battery in accordance with Embodiment 3 of the present invention is not limited to any particular one, provided that the negative electrode is one that is generally used as a negative electrode of a nonaqueous electrolyte secondary battery. Examples of the negative electrode encompass a negative electrode sheet having a structure in which an active material layer containing a negative electrode active material and a binder resin is formed on a current collector. The active material layer may further contain an electrically conductive agent.

Examples of the negative electrode active material encompass (i) a material capable of being doped with and dedoped of lithium ions, (ii) lithium metal, and (iii) lithium alloy. Examples of the material encompass carbonaceous materials. Examples of the carbonaceous materials encompass natural graphite, artificial graphite, cokes, carbon black, and pyrolytic carbons. The electrically conductive agent which can be contained in the active material layer can be any of the electrically conductive agents, described in the <Positive electrode> section, which can be contained in the positive electrode active material layer.

Examples of the negative electrode current collector encompass electric conductors such as Cu, Ni, and stainless steel. Among these, Cu is more preferable because Cu is not easily alloyed with lithium especially in the case of a lithium ion secondary battery and is easily processed into a thin film.

Examples of a method for producing the negative electrode sheet encompass: a method in which a negative electrode active material is pressure-molded on a negative electrode current collector; and a method in which (i) a negative electrode active material is formed into a paste with the use of a suitable organic solvent, (ii) then, a negative electrode current collector is coated with the paste, and (iii) subsequently, the paste is dried and then pressured so that the paste is firmly fixed to the negative electrode current collector. The above paste preferably includes the above electrically conductive agent and the binding agent.

<Nonaqueous Electrolyte>

A nonaqueous electrolyte in a nonaqueous electrolyte secondary battery in accordance with Embodiment 3 of the present invention is not limited to any particular one, provided that the nonaqueous electrolyte is one that is generally used for a nonaqueous electrolyte secondary battery. The nonaqueous electrolyte can be one prepared by, for example, dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2BioCl_{10}$, lower aliphatic carboxylic acid lithium salt, and LiAlCl$_4$. It is possible to use only one kind of the above lithium salts or two or more kinds of the above lithium salts in combination.

Examples of the organic solvent to be contained in the nonaqueous electrolyte encompass carbonates, ethers, esters, nitriles, amides, carbamates, a sulfur-containing compound, and a fluorine-containing organic solvent obtained by introducing a fluorine group into any of these organic solvents. It is possible to use only one kind of the above organic solvents or two or more kinds of the above organic solvents in combination.

<Method of Producing Nonaqueous Electrolyte Secondary Battery Member and Method of Producing Nonaqueous Electrolyte Secondary Battery>

Examples of a method of producing a nonaqueous electrolyte secondary battery member in accordance with Embodiment 2 of the present invention encompass a method in which the positive electrode, the nonaqueous electrolyte secondary battery separator in accordance with Embodiment 1 of the present invention, and the negative electrode are disposed in this order.

Further, examples of a method of producing a nonaqueous electrolyte secondary battery in accordance with Embodiment 3 of the present invention encompass a method of producing a nonaqueous electrolyte secondary battery in accordance with Embodiment 3 of the present invention by (i) forming a nonaqueous electrolyte secondary battery member by the method described above, (ii) placing the nonaqueous electrolyte secondary battery member in a container which is to serve as a housing of the nonaqueous electrolyte secondary battery, (iii) filling the container with a nonaqueous electrolyte, and then (iv) hermetically sealing the container while reducing the pressure inside the container.

EXAMPLES

The following description will discuss embodiments of the present invention in greater detail with reference to Examples and Comparative Example. Note, however, that the present invention is not limited to the following Examples.

[Measurement Method]

The following method was used for measurement of physical properties and the like of each of nonaqueous electrolyte secondary battery separators which had been produced in Examples 1 to 3 and Comparative Example 1 and measurement of a battery resistance decreasing rate before and after battery formation of each of nonaqueous electrolyte secondary batteries which had been produced in Examples 1 to 3 and Comparative Example 1.

(1) Film Thickness (Unit: μm)

A film thickness of each of the nonaqueous electrolyte secondary battery separators was measured with the use of a high-precision digital measuring device (VL-50) manufactured by Mitutoyo Corporation.

(2) Radical Concentration (Unit: Spin/Mg)

An electron spin resonance spectrometer (product name: E500; manufactured by BRUKER) was used to measure ESR spectrum of each of the nonaqueous electrolyte secondary battery separators under the conditions described below (See FIG. 1). From a peak at a g-value of not less than 2.010 in the ESR spectrum thus obtained, the concentration of inorganic radicals contained in each of the nonaqueous electrolyte secondary battery separators (hereinafter also referred to as "inorganic radical concentration") was calculated.

Specifically, ESR spectrum of a standard sample having a known concentration was measured under the conditions described below, and an area of a peak in the ESR spectrum thus obtained was calculated. From the peak area obtained with use of the standard sample having a known concentration, was generated a calibration curve indicative of a relationship between the peak area and the inorganic radical concentration.

Thereafter, ESR spectrum of each of the nonaqueous electrolyte secondary battery separators was measured under the conditions described below, and each peak area at a g-value of not less than 2.010 was calculated. From the peak area thus calculated, the inorganic radical concentration was calculated based on the above-described calibration curve. Note that the calculation of the inorganic radical concentration was carried out on the assumption that all of the inorganic radicals contained in the standard sample and in the nonaqueous electrolyte secondary battery separator were radicals with spin S=½.

Note that in a case where two or more peaks at the g-value of not less than 2.010 were observed, separate radical concentrations were calculated from the respective two or more peaks. Thereafter, the radical concentrations thus calculated from the respective peaks were summed, and a total radical concentration thus obtained was regarded as a concentration of inorganic radicals contained in the nonaqueous electrolyte secondary battery separator and having a g-value of not less than 2.010.

<Analysis Conditions of Electron Spin Resonance Spectrometer>

Microwave frequency: 9.4 GHz
Microwave strength: 2.0 mV
Sweep magnetic field range: 500 mT (5000 Gauss)
Modulated magnetic field amplitude: 0.15 mT (1.5 Gauss)
Measurement temperature: room temperature (20° C.)
Standard sample: DPPH (3) Battery Resistance Decreasing Rate Before and after Battery Formation The following method was used for measurement of a battery resistance decreasing rate before and after battery formation of each of the nonaqueous electrolyte secondary batteries which had been produced in Examples 1 to 3 and Comparative Example 1.

Battery resistance of each of nonaqueous electrolyte secondary batteries which had been produced in Examples 1 to 3 and Comparative Example 1 and had not undergone a charge and discharge cycle was measured with use of an LCR meter manufactured by Hioki E.E. Corporation (product name: chemical impedance meter; type: 3532-80).

Specifically, at room temperature (25° C.), a voltage having an amplitude of 10 mV was applied to each of the nonaqueous electrolyte secondary batteries, so that their respective Nyquist plots were obtained. Based on each of the Nyquist plots, a resistance value $R_{10\ Hz}$ of a real part of a measuring frequency of 10 Hz was calculated. The value of $R_{10\ Hz}$ was defined as a value of battery resistance before battery formation.

Each of the nonaqueous electrolyte secondary batteries which had been subjected to measurement of battery resistance before battery formation was subjected to four cycles of initial charge and discharge. Each of the four cycles of the initial charge and discharge was carried out at room temperature (25° C.), at a voltage ranging from 4.1 V to 2.7 V, and at an electric current value of 0.2 C (note that 1 C is an electric current value at which a battery rated capacity derived from a one-hour rate discharge capacity is discharged in one hour, and this applies to the following descriptions).

In a manner similar to the measurement of battery resistance before battery formation, a voltage having an amplitude of 10 mV was applied to each of the nonaqueous electrolyte secondary batteries which had been subjected to the initial charge and discharge, so that their respective Nyquist plots were obtained. Then, based on each of the Nyquist plots, a resistance value $R'_{10\,Hz}$ of a real part of a measuring frequency of 10 Hz was calculated. The value of $R'_{10\,Hz}$ was defined as a value of battery resistance after battery formation.

The battery resistance decreasing rate R before and after battery formation was calculated by substituting the value of $R_{10\,Hz}$ and the value of $R'_{10\,Hz}$ in the following equation (2):

$$R = (R_{10\,Hz} - R'_{10\,Hz})/R_{10\,Hz} \times 100 \qquad (2)$$

Note that the "battery resistance decreasing rate before and after battery formation" in the Examples herein can also be referred to as "10 Hz battery resistance decreasing rate before and after battery formation" since the measurement of battery resistance is carried out at the measuring frequency of 10 Hz in the Examples herein.

Example 1

<Production of Nonaqueous Electrolyte Secondary Battery Separator>

First, 18 parts by weight of ultra-high molecular weight polyethylene powder (Hi-Zex Million 145M; melting point: 136° C.; manufactured by Mitsui Chemicals, Inc.) and 2 parts by weight of petroleum resin having many tertiary carbon atoms in its structure (alicyclic saturated hydrocarbon resin having softening point of 125° C.; burning point: 240° C.; melting point: 180° C.) were prepared. These powders were pulverized and mixed by a blender to obtain a mixture 1. Here, pulverization was carried out until particles of the powders had the same particle diameter.

The mixture 1 was fed into a twin screw kneader through a quantitative feeder and was then melt-kneaded at a temperature of 210° C. At this time, 80 parts by weight of liquid paraffin was fed under pressure into the twin screw kneader via a pump, and was melt-kneaded together with the mixture 1. The internal temperature of the twin screw kneader after the liquid paraffin had been fed into the twin screw kneader was 197° C. Note that the "internal temperature of the twin screw kneader" is an internal temperature of a segment-type barrel in the twin screw kneader. The segment-type barrel indicates a block-type barrel which can be connected to another block-type barrel(s) so that connected block-type barrels have an intended total length. Further, a resin pressure at the outlet of the twin screw kneader was 8.4 MPa.

Subsequently, a resultant melt-kneaded mixture 1 was extruded through a T-die via a gear pump into the shape of a sheet. This produced a sheet-shaped polyolefin resin composition 1a. The sheet-shaped polyolefin resin composition 1a thus obtained was wound on a cooling roller so as to be cooled down. After the sheet-shaped polyolefin resin composition 1a was cooled down, the sheet-shaped polyolefin resin composition 1a was subjected to sequential stretching in which the sheet-shaped polyolefin resin composition 1a was stretched to 6.4 times in the MD direction and then stretched to 6 times in the TD direction. This produced a stretched polyolefin resin composition 1b.

The stretched polyolefin resin composition 1b was cleaned for 15 seconds with use of heptane as a cleaning liquid, and then, the polyolefin resin composition 1b was cleaned for 15 seconds with use of heptane as a newly prepared cleaning liquid. The polyolefin resin composition 1b thus cleaned was left to stand still for 5 minutes in a ventilation oven, in which a temperature was set to 129° C., so that the polyolefin resin composition 1b was dried and heat-fixed. A polyolefin porous film 1 was thus obtained. The polyolefin porous film 1 thus obtained was employed as a nonaqueous electrolyte secondary battery separator 1.

As a result of measurement of the film thickness of the polyolefin porous film 1 by the above-described measurement method, the polyolefin porous film 1 had a film thickness of 16 μm. Further, the inorganic radical concentration of the polyolefin porous film 1 was measured by the above-described measurement method. The inorganic radical concentration of the polyolefin porous film 1 is shown in Table 1.

[Preparation of Nonaqueous Electrolyte Secondary Battery]

(Preparation of Positive Electrode)

As a positive electrode, a commercially available positive electrode was used which had been produced by applying $LiNi_{0.5}Mn_{0.3}Co_{0.2}O_2$/electrically conductive agent/PVDF (weight ratio of 92:5:3) to an aluminum foil. The aluminum foil of the commercially available positive electrode was cut so that (i) a first portion of the aluminum foil, on which first portion a positive electrode active material layer was formed, had a size of 40 mm×35 mm and (ii) a second portion of the aluminum foil, on which second portion no positive electrode active material layer was formed and which second portion had a width of 13 mm, remained on an outer periphery of the first portion. A positive electrode thus obtained was used. The positive electrode active material layer had a thickness of 58 μm and a density of 2.50 $g/cm^3$.

(Preparation of Negative Electrode)

As a negative electrode, a commercially available negative electrode was used which had been produced by applying graphite/styrene-1,3-butadiene copolymer/sodium carboxymethylcellulose (weight ratio of 98:1:1) to a copper foil. The copper foil of the commercially available negative electrode was cut so that (i) a first portion of the copper foil, on which first portion a negative electrode active material layer was formed, had a size of 50 mm×40 mm and (ii) a second portion of the copper foil, on which second portion no negative electrode active material layer was formed and which second portion had a width of 13 mm, remained on an outer periphery of the first portion. A negative electrode thus obtained was used. The negative electrode active material layer had a thickness of 49 μm and a density of 1.40 $g/cm^3$.

(Assembly of Nonaqueous Electrolyte Secondary Battery)

A nonaqueous electrolyte secondary battery was produced by the following method with use of the positive electrode, the negative electrode, and the nonaqueous electrolyte secondary battery separator 1.

The positive electrode, the nonaqueous electrolyte secondary battery separator 1, and the negative electrode were disposed (arranged) in this order in a laminate pouch to obtain a nonaqueous electrolyte secondary battery member 1. In so doing, the positive electrode and the negative electrode were arranged so that a main surface of the positive electrode active material layer of the positive electrode was entirely included in a range of a main surface of the negative electrode active material layer of the negative electrode (i.e., entirely covered by the main surface of the negative electrode active material layer of the negative electrode).

Subsequently, the nonaqueous electrolyte secondary battery member 1 was put into a bag which had been formed by disposing an aluminum layer on a heat seal layer. Further, 0.23 mL of a nonaqueous electrolyte was put into the bag. The nonaqueous electrolyte was a nonaqueous electrolyte prepared by dissolving $LiPF_6$ in a mixed solvent, in which ethylene carbonate, ethyl methyl carbonate, and diethyl carbonate were mixed at 3:5:2 (volume ratio), so that the $LiPF_6$ had a concentration of 1 mol/L. Then, a nonaqueous electrolyte secondary battery 1 was produced by heat sealing the bag while reducing pressure in the bag.

Thereafter, a battery resistance decreasing rate before and after battery formation of the nonaqueous electrolyte secondary battery 1 was measured. The results are shown in Table 1.

Example 2

[Production of Nonaqueous Electrolyte Secondary Battery Separator]

First, 18 parts by weight of ultra-high molecular weight polyethylene powder (Hi-Zex Million 145M; melting point: 136° C.; manufactured by Mitsui Chemicals, Inc.) and 2 parts by weight of petroleum resin having many tertiary carbon atoms in its structure (alicyclic saturated hydrocarbon resin having softening point of 90° C.; burning point: 210° C.; melting point: 130° C.) were prepared. These powders were pulverized and mixed by a blender to obtain a mixture 2. Here, pulverization was carried out until particles of the powders had the same particle diameter.

Next, the mixture 2 was subjected to melt-kneading, extrusion, cooling, and stretching under the same conditions as those in Example 1. This produced a stretched polyolefin resin composition 2b. The internal temperature of the twin screw kneader after the liquid paraffin had been fed into the twin screw kneader was 195° C., and a resin pressure at the outlet of the twin screw kneader was 8.5 MPa.

Subsequently, the polyolefin resin composition 2b was cleaned for 5 seconds with use of heptane as a cleaning liquid, and then, the polyolefin resin composition 2b was cleaned for 5 seconds with use of heptane as a newly prepared cleaning liquid. The polyolefin resin composition 2b thus cleaned was left to stand still for 5 minutes in a ventilation oven, in which a temperature was set to 129° C., so that the polyolefin resin composition 2b was dried and heat-fixed. A polyolefin porous film 2 was thus obtained. The polyolefin porous film 2 thus obtained was employed as a nonaqueous electrolyte secondary battery separator 2.

As a result of measurement of the film thickness of the polyolefin porous film 2 by the above-described measurement method, the polyolefin porous film 2 had a film thickness of 16 µm. Further, the inorganic radical concentration of the polyolefin porous film 2 was measured by the above-described measurement method. The inorganic radical concentration of the polyolefin porous film 2 is shown in Table 1.

[Preparation of Nonaqueous Electrolyte Secondary Battery]

A nonaqueous electrolyte secondary battery was produced as in Example 1, except that the nonaqueous electrolyte secondary battery separator 2 was used instead of the nonaqueous electrolyte secondary battery separator 1. The nonaqueous electrolyte secondary battery thus produced was referred to as a nonaqueous electrolyte secondary battery 2.

Thereafter, a battery resistance decreasing rate before and after battery formation of the nonaqueous electrolyte secondary battery 2 was measured. The results are shown in Table 1.

Example 3

[Production of Nonaqueous Electrolyte Secondary Battery Separator]

The stretched polyolefin resin composition 2b obtained in Example 2 was cleaned, dried, and heat-fixed under the same conditions as those in Example 1. A polyolefin porous film 3 was thus obtained. The polyolefin porous film 3 was employed as a nonaqueous electrolyte secondary battery separator 3.

As a result of measurement of the film thickness of the polyolefin porous film 3 by the above-described measurement method, the polyolefin porous film 3 had a film thickness of 18 µm. Further, the inorganic radical concentration of the polyolefin porous film 3 was measured by the above-described measurement method. The inorganic radical concentration of the polyolefin porous film 3 is shown in Table 1.

[Preparation of Nonaqueous Electrolyte Secondary Battery]

A nonaqueous electrolyte secondary battery was produced as in Example 1, except that the nonaqueous electrolyte secondary battery separator 3 was used instead of the nonaqueous electrolyte secondary battery separator 1. The nonaqueous electrolyte secondary battery thus produced was referred to as a nonaqueous electrolyte secondary battery 3.

Thereafter, a battery resistance decreasing rate before and after battery formation of the nonaqueous electrolyte secondary battery 3 was measured. The results are shown in Table 1.

Comparative Example 1

[Production of Nonaqueous Electrolyte Secondary Battery Separator]

First, 18 parts by weight of ultra-high molecular weight polyethylene powder (Hi-Zex Million 145M; melting point: 136° C.; manufactured by Mitsui Chemicals, Inc.) and 2 parts by weight of petroleum resin having many tertiary carbon atoms in its structure (alicyclic saturated hydrocarbon resin having softening point of 115° C.; burning point: 230° C.; melting point: 160° C.) were prepared. These powders were pulverized and mixed by a blender to obtain a mixture 4. Here, pulverization was carried out until particles of the powders had the same particle diameter.

Next, the mixture 4 was subjected to melt-kneading, extrusion, cooling, and stretching under the same conditions as those in Example 1. This produced a stretched polyolefin resin composition 4b. The internal temperature of the twin screw kneader after the liquid paraffin had been fed into the twin screw kneader was 199° C., and a resin pressure at the outlet of the twin screw kneader was 7.9 MPa.

The stretched polyolefin resin composition 4b was cleaned for 25 seconds with use of heptane as a cleaning liquid, and then, the polyolefin resin composition 4b was cleaned for 25 seconds with use of heptane as a newly prepared cleaning liquid. The polyolefin resin composition 4b thus cleaned was left to stand still for 1 minute in a ventilation oven, in which a temperature was set to 120° C., so that the polyolefin resin composition 4b was dried and heat-fixed. A polyolefin porous film 4 was thus obtained. The polyolefin porous film 4 thus obtained was employed as a nonaqueous electrolyte secondary battery separator 4.

As a result of measurement of the film thickness of the polyolefin porous film 4 by the above-described measurement method, the polyolefin porous film 4 had a film thickness of 15 μm. Further, the inorganic radical concentration of the polyolefin porous film 4 was measured by the above-described measurement method. The inorganic radical concentration of the polyolefin porous film 4 is shown in Table 1.

[Preparation of Nonaqueous Electrolyte Secondary Battery]

A nonaqueous electrolyte secondary battery was produced as in Example 1, except that the nonaqueous electrolyte secondary battery separator 4 was used instead of the nonaqueous electrolyte secondary battery separator 1. The nonaqueous electrolyte secondary battery thus produced was referred to as a nonaqueous electrolyte secondary battery 4.

Thereafter, a battery resistance decreasing rate before and after battery formation of the nonaqueous electrolyte secondary battery 4 was measured. The results are shown in Table 1.

[Results]

The following Table 1 shows (i) the physical properties of the nonaqueous electrolyte secondary battery separators 1 to 4 produced in Examples 1 to 3 and Comparative Example 1, respectively, and (ii) the battery resistance decreasing rates before and after battery formation of the nonaqueous electrolyte secondary batteries 1 to 4 produced in Examples 1 to 3 and Comparative Example 1, respectively.

TABLE 1

| | Nonaqueous electrolyte secondary battery separator Inorganic radical concentration [×$10^{12}$ spins/mg] | Nonaqueous electrolyte secondary battery Battery resistance decreasing rate before and after battery formation [%] |
|---|---|---|
| Example 1 | 19000 | 12 |
| Example 2 | 86000 | 24 |
| Example 3 | 5400 | 12 |
| Comparative Example 1 | 2700 | −1 |

As shown in Table 1, it was found that the nonaqueous electrolyte secondary battery separator having inorganic radical concentration of not less than 5000×$10^{12}$ spins/mg and not more than 90000×$10^{12}$ spins/mg allows a nonaqueous electrolyte secondary battery including such a nonaqueous electrolyte secondary battery separator to have a higher battery resistance decreasing rate before and after battery formation, as compared to the nonaqueous electrolyte secondary battery separator having inorganic radical concentration outside the above range.

A nonaqueous electrolyte secondary battery separator in accordance with an embodiment of the present invention allows a nonaqueous electrolyte secondary battery including the nonaqueous electrolyte secondary battery separator to have a lower battery resistance before and after battery formation (before and after initial charge and discharge).

INDUSTRIAL APPLICABILITY

A nonaqueous electrolyte secondary battery separator in accordance with an embodiment of the present invention allows a nonaqueous electrolyte secondary battery including the nonaqueous electrolyte secondary battery separator to have an improved battery resistance decreasing rate before and after battery formation. Thus, a nonaqueous electrolyte secondary battery separator in accordance with an embodiment of the present invention is suitably applicable in various industries which deal with nonaqueous electrolyte secondary batteries.

The invention claimed is:

1. A nonaqueous electrolyte secondary battery separator comprising:
   a polyolefin porous film produced using a catalyst containing a transition metal,
   the nonaqueous electrolyte secondary battery separator having a concentration of radicals of not less than 5000×$10^{12}$ spins/mg and not more than 90000×$10^{12}$ spins/mg, wherein the concentration is calculated from a peak at a g-value of not less than 2.010 in an electron spin resonance spectrum obtained through electron spin resonance analysis using a microwave having a frequency of 9.4 GHz,
   the nonaqueous electrolyte secondary battery separator containing the transition metal from production of the polyolefin porous film,
   the concentration of radicals (i) meaning a concentration of inorganic radicals derived from the transition metal and contained in the nonaqueous electrolyte secondary battery separator and (ii) being calculated by a radical concentration calculation method comprising:
   measuring an electron spin resonance spectrum of diphenylpicrylhydrazyl (DPPH) as a standard sample having a known concentration using an electron spin resonance spectrometer,
   using an area of a peak in the electron spin resonance spectrum of the DPPH to generate a calibration curve indicative of a relationship between the area of the peak and the concentration of radicals in the DPPH,
   measuring an electron spin resonance spectrum of the nonaqueous electrolyte secondary battery separator under the above conditions,
   calculating areas of peaks at a g-value of not less than 2.010, and
   based on the calibration curve calculating the concentration of inorganic radicals derived from a transition metal in the nonaqueous electrolyte secondary battery separator from a sum of the areas of the peaks,
   wherein the concentration of inorganic radicals derived from a transition metal is calculated based on the assumption that all of the inorganic radicals derived from a transition metal contained in the standard sample and in the nonaqueous electrolyte secondary battery separator have spin S=1/2, and when two or more peaks at the g-value of not less than 2.010 are observed, separate radical concentrations are calculated from the respective two or more peaks, and a total radical concentration obtained by adding the separate radical concentrations is regarded as the concentration of inorganic radicals derived from a transition metal.

2. A nonaqueous electrolyte secondary battery member comprising:
   a positive electrode;
   a nonaqueous electrolyte secondary battery separator recited in claim 1; and
   a negative electrode,
   the positive electrode, the nonaqueous electrolyte secondary battery separator, and the negative electrode being disposed in this order.

3. A nonaqueous electrolyte secondary battery comprising:

a nonaqueous electrolyte secondary battery separator recited in claim 1.

4. The nonaqueous electrolyte secondary battery separator as set forth in claim 1, further comprising:
   an insulating porous layer disposed on the polyolefin porous film, the insulating porous layer containing one or more resins selected from the group consisting of a polyolefin, a (meth)acrylate-based resin, a fluorine-containing resin, a polyamide-based resin, a polyester-based resin, and a water-soluble polymer.

5. The nonaqueous electrolyte secondary battery separator as set forth in claim 4, wherein the polyamide-based resin is an aramid resin.

\* \* \* \* \*